United States Patent
Krebs et al.

(10) Patent No.: US 10,087,534 B2
(45) Date of Patent: Oct. 2, 2018

(54) HYDROGEN EVOLUTION CELL HAVING A CATHODE POCKET

(71) Applicants: VARTA Microbattery GmbH, Ellwangen (DE); Fraunhofer-Gesellschaft zur Forderung der angewandten Forschung e.V., Munich (DE)

(72) Inventors: Martin Krebs, Rosenberg (DE); Robert Hahn, Berlin (DE); Michael Schmalz, Ellwangen (DE)

(73) Assignee: Varta Microbattery GmbH (DE)

( * ) Notice: Subject to any disclaimer, the term of this patent is extended or adjusted under 35 U.S.C. 154(b) by 267 days.

(21) Appl. No.: 13/954,238

(22) Filed: Jul. 30, 2013

(65) Prior Publication Data

US 2014/0034485 A1     Feb. 6, 2014

(30) Foreign Application Priority Data

Aug. 2, 2012 (EP) .................................... 12179038

(51) Int. Cl.

| C25B 11/00 | (2006.01) |
| C25B 9/08 | (2006.01) |
| C25B 9/06 | (2006.01) |
| C25B 9/18 | (2006.01) |
| C25B 9/00 | (2006.01) |
| C25B 11/03 | (2006.01) |
| C25B 11/04 | (2006.01) |
| C25B 1/04 | (2006.01) |
| C25B 1/02 | (2006.01) |

(52) U.S. Cl.
CPC .................. *C25B 9/00* (2013.01); *C25B 1/02* (2013.01); *C25B 1/04* (2013.01); *C25B 11/035* (2013.01); *C25B 11/0447* (2013.01); *Y02E 60/366* (2013.01)

(58) Field of Classification Search
CPC ....... C25B 11/00; C25B 11/035; C25B 11/04; C25B 1/04; C25B 9/06; C25B 9/08; C25B 9/18; C25B 9/206; C25B 1/02; C25B 9/00; C25B 9/12; C25C 7/02; C25C 7/00; C25C 1/16; C25C 3/12; C25C 3/16
USPC .................................................. 204/242, 280
See application file for complete search history.

(56) References Cited

U.S. PATENT DOCUMENTS

| 4,409,084 A | 10/1983 | Yamaguchi et al. |
| 6,890,410 B2* | 5/2005 | Sullivan .................... C25B 1/04 |
| | | 204/258 |

(Continued)

FOREIGN PATENT DOCUMENTS

| CH | 175666 A | 3/1935 |
| DE | 412217 C | 4/1925 |

(Continued)

*Primary Examiner* — Zulmariam Mendez
(74) *Attorney, Agent, or Firm* — DLA Piper LLP (US)

(57) ABSTRACT

A hydrogen evolution cell which on passage of an electric current liberates an amount of hydrogen proportional to an amount of current flowing through, includes an electrochemically oxidizable anode, a hydrogen cathode, an electrolyte and a casing surrounding the same, wherein the hydrogen cathode is associated structure of at least one pocket defining a hollow space or defines a hollow space in the presence of hydrogen overpressure or wherein the cathode forms such a pocket.

11 Claims, 3 Drawing Sheets

(56) References Cited

U.S. PATENT DOCUMENTS

| | | | |
|---|---|---|---|
| 2008/0083614 A1* | 4/2008 | Swalla et al. | 204/242 |
| 2008/0169188 A1* | 7/2008 | Gil et al. | 204/258 |
| 2010/0096275 A1* | 4/2010 | Oldani et al. | 205/556 |
| 2013/0330651 A1* | 12/2013 | Thompsett et al. | 429/482 |

FOREIGN PATENT DOCUMENTS

| | | |
|---|---|---|
| DE | 35 32 335 A1 | 3/1987 |
| DE | 41 16 359 A1 | 11/1992 |
| EP | 0 144 002 A2 | 6/1985 |
| EP | 0 144 002 A3 | 6/1985 |
| EP | 1 396 899 A2 | 3/2004 |

* cited by examiner

US 10,087,534 B2

HYDROGEN EVOLUTION CELL HAVING A CATHODE POCKET

TECHNICAL FIELD

This disclosure relates to a hydrogen evolution cell.

BACKGROUND

Such hydrogen evolution cells comprise an anode chamber and a cathode chamber inside a casing which chambers are separated from one another by a separator. Corresponding cells comprising a metal anode in the form of a zinc paste, a hydrogen electrode and an aqueous electrolyte are known from DE 35 32 335 A1 and EP 1 396 899 A2, for example.

In hydrogen evolution cells, the hydrogen reaction gas is stored chemically in the form of water being the main constituent of the electrolyte and generally unpressurized. In the case of cells having a metal anode made of zinc, the evolution of hydrogen occurs according to the following reaction equations:

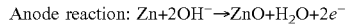

Anode reaction: $Zn+2OH^- \rightarrow ZnO+H_2O+2e^-$

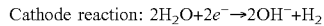

Cathode reaction: $2H_2O+2e^- \rightarrow 2OH^-+H_2$

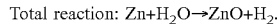

Total reaction: $Zn+H_2O \rightarrow ZnO+H_2$.

Thus, in the course of the above reaction, the zinc contained in the cell is oxidized to zinc oxide while hydrogen gas develops at the cathode.

Generally, hydrogen evolution results in a slight overpressure in the cells. If the overpressure increases further, there is a risk that the separator bulges and exerts a pressure on the anode chamber, as a result of which electrolyte can leak from the cell. In other words, hydrogen overpressure can be the cause for the occurrence of leaks.

Moreover, since the casings of hydrogen evolution cells are generally formed in two parts and comprise a cell cup and a cell lid, laborious measures have to be taken to achieve a hermetic sealing of the cells. Usually, that is effected by using sealing rings and crimping or screwing of the cell cup and the cell lid.

Thus, such hydrogen evolution cells have several potential leakage spots or constructional designs which might result in leaks at the expense of the service life of the cells.

Thus, it could be helpful to provide a hydrogen evolution cell which avoids deficiencies described above in the context of hydrogen evolution cells and, which in particular, has a significantly reduced risk regarding the occurrence of leaks as compared to known hydrogen evolutions cells.

SUMMARY

We provide a hydrogen evolution cell which on passage of an electric current liberates an amount of hydrogen proportional to an amount of current flowing through, including an electrochemically oxidizable anode, a hydrogen cathode, an electrolyte and a casing surrounding the same, wherein the hydrogen cathode is associated structure of at least one pocket defining a hollow space or defines a hollow space in the presence of hydrogen overpressure or wherein the cathode forms such a pocket.

DETAILED DESCRIPTION

Figure 1:
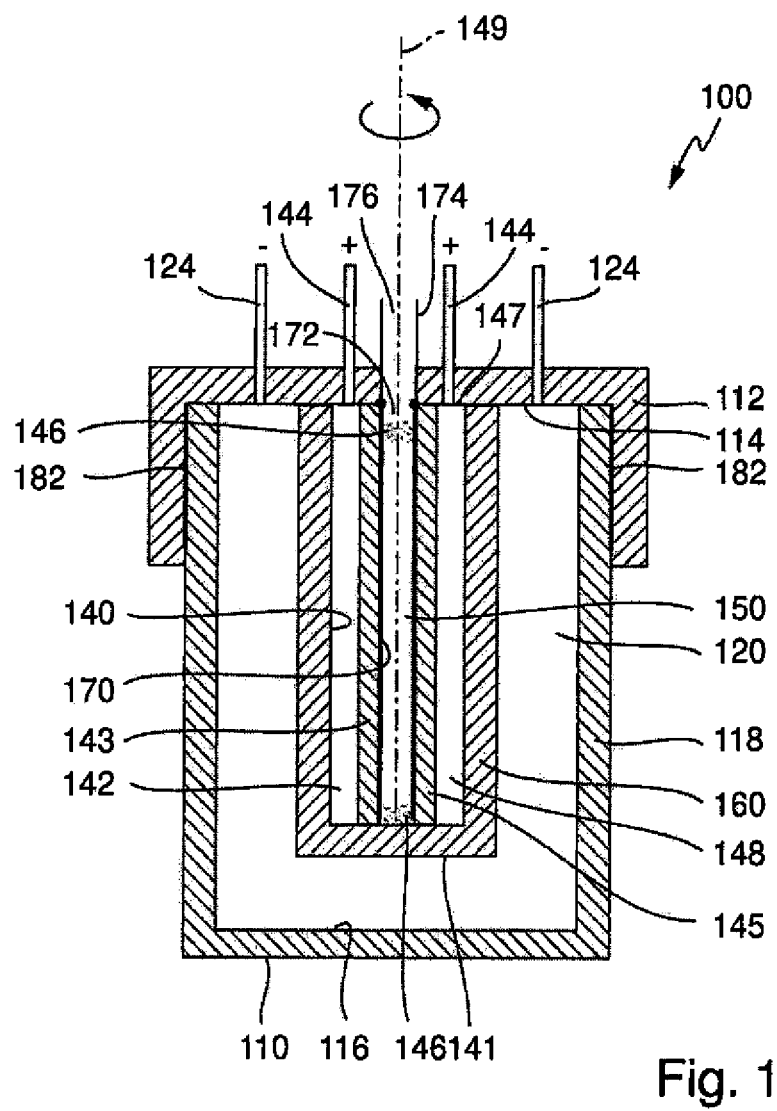
FIG. 1 schematically shows a cross-section of an example of a hydrogen evolution cell.

Our hydrogen evolution cell comprises an electrochemically oxidizable anode, a hydrogen cathode, an electrolyte as well as a casing. The casing includes the aforementioned active components (anode, cathode and electrolyte) as well as further components, where appropriate.

On passage of an electric current, the hydrogen evolution cell liberates an amount of hydrogen proportional to the amount of current flowing therethrough. The hydrogen amount obtained is interrelated to the electrical charge flow-through according to Faraday's Law. Thus, the developing hydrogen amount can exactly be controlled via the current.

The electrolyte is preferably an aqueous electrolyte, in particular an alkaline electrolyte such as sodium hydroxide or potassium hydroxide, for example.

The anode is preferably a metal anode (an anode made of metal) or a metal-containing anode. The metal can be present in the type of a paste, a powder or a gel. The metal is preferably a base metal (non-precious metal) or a base metal alloy. The metal or the alloy, respectively, can be selected, for example, from the group consisting of zinc, magnesium, aluminum and alloys thereof.

Particularly preferred, the anode is a zinc anode or a zinc-containing anode, wherein the zinc may be present in particular as a paste, a powder or a gel. In other words, the anode preferably includes a zinc paste, a zinc powder or a zinc gel or is preferably composed of such a paste, such a powder or such a gel, respectively.

A magnesium-aluminum alloy represents a preferred alloy for the anode, in particular in the form of a sheet metal.

As an alternative or in addition to the above examples, the anode may or may not be amalgamated.

Generally, an anode conductor is assigned to the anode. The anode conductor may be formed as a foil, a sheet, an expanded metal or the like and may be composed, for example, of zinc, brass, copper or other materials typical of button cells, in particular of mercury-free button cells.

The hydrogen cathode preferably includes a noble metal such as, for example, palladium and/or platinum. As an alternative or in combination thereto, the hydrogen cathode may include nickel, in particular Raney nickel.

Generally, to the hydrogen cathode is assigned an electrode conductor as well, namely a cathode conductor.

The anode and/or the cathode can be configured (in each case) in the form of a sheet metal. In that case, conductors as independent components may be omitted.

Particularly preferably, the hydrogen cathode is a gas diffusion cathode, in particular a synthetic material bound gas diffusion electrode. In the case of synthetic material bound gas diffusion electrodes, a binder made of synthetic material, preferably polytetrafluoroethylene (PTFE), forms a porous matrix, in which particles made of an electrocatalytically active material are incorporated. For example, the electrocatalytically active material may be a metal, as already mentioned above in connection with the hydrogen cathode, or carbon powder. In any case, the electrocatalytically active material has to be capable of catalyzing the reduction of water to hydrogen. Usually, the production of such electrodes is effected by rolling a dry mixture of the binder and the catalyst to form a foil. In turn, the latter may be rolled into a metal mesh, for example, made of silver, nickel or silver-plated nickel. The metal mesh forms a conductor structure inside the cathode and serves as a current conductor. Furthermore, it is preferred when the gas diffusion electrode on the side facing away from the metal mesh is covered with a micro-porous and hydrophobic layer, preferably in the form of a polytetrafluoroethylene foil (PTFE foil).

The casing typically comprises two casing parts, namely a casing cup and a casing lid. Generally, the casing has a planar bottom region and the lid has a planar lid region parallel to the bottom region. However, more details will be given on the housing below.

The hydrogen evolution cell is particularly characterized in that the hydrogen cathode is involved in the structure of at least one pocket defining a hollow space or defining a hollow space as a consequence of hydrogen overpressure in the cell or that the cathode forms such a pocket (cathode pocket).

As a result, with particular advantage, the pocket can serve as a reservoir for hydrogen developing in the cell and thus counterbalance an overpressure that might pose a risk to the leak tightness of the cell.

Furthermore, formation of at least one cathode pocket provides the advantageous option of aligning the cathode pocket and further active components of the cell orthogonally or essentially orthogonally to a casing bottom region, whereby the risk of leaks is minimized.

The term "pocket" refers generally to a hollow body defining a cavity open on one side, the cavity of which is limited by a circumferential pocket wall and a pocket bottom and which cavity has a pocket opening opposite to the pocket bottom, along which opening hydrogen formed during the cell operation can flow out of the pocket.

The term "at least one pocket" refers to one pocket or to a plurality of pockets, that is to say two or more, for example, three pockets.

Preferably, the hydrogen cathode is configured in the form of at least one hollow body, preferably at least one hollow cylinder. The term "hollow cylinder" or "hollow-cylindrical" is to have a broad meaning and refers to a hollow body which is defined by two parallel plane faces, namely a bottom face and a cover face, as well as a shell or cylinder face which is formed by parallel straight lines. As a result, the term "hollow cylinder" or "hollow cylindrical" refers in particular to hollow prisms, hollow cylinders having an elliptic base and cover face, hollow cylinders having a circular base and cover face (hollow circular cylinder) and the like. Furthermore, the term "at least one hollow body" defines a hollow body or a plurality of hollow bodies, i.e., two or more, for example, three hollow bodies.

The inner face of the at least one hollow body or hollow cylinder is preferably lined with a porous, in particular a micro-porous, and hydrophobic layer, preferably in the form of a foil. The selection of the layer or foil, respectively, is not critical providing it allows for the passage of hydrogen due to the porous configuration thereof and prevents the passage of an electrolyte due to a high capillary depression in the pores. Such a layer or foil, respectively, may be laminated on the hydrogen cathode, for example. Preferably, the interior face of the at least one hollow body or hollow cylinder is coated with a polytetrafluoroethylene foil. As a result, the hydrogen developing during the cell operation can get into the at least one pocket and be removed from the pocket (depending on demand).

The hydrogen cathode may be present in the form of a cathode composite forming at least one hollow body, preferably a hollow cylinder.

the term "at least one cathode composite" refers to one cathode composite or to a plurality of cathode composites, i.e., two or more, for example, three cathode composites.

The at least one cathode composite is preferably composed of at least two cathode bodies.

The term "at least two cathode bodies" comprises two or more, for example, three cathode bodies.

Particularly preferable, the at least two cathode bodies are two cathode halves.

Advantageously, the at least two cathode bodies connect to one another on the edge side to form the at least one cathode composite, in particular on the longitudinal edge side, and preferably by material engagement, in particular bonded.

For example, the at least two cathode bodies can be connected to one another via sealing or bonding means. Suitable sealing and bonding means may be selected from the group consisting of dextrin, polyvinyl alcohol, cellulose ether or mixtures thereof.

Conveniently, the at least two cathode bodies are formed in each case in the form of a layer and/or a strip, in particular having a layer or strip thickness, respectively, in the micron range (μm).

Preferably, the at least two cathode bodies are in each case configured in the form of a foil.

The at least two cathode bodies may be coated on one side with a porous, in particular a micro-porous, and hydrophobic layer, preferably in the form of a foil. Particularly preferably, the at least two cathode bodies are covered or coated on one side with a polytetrafluoroethylene foil (PTFE foil). With regard to further details on the layer or foil, respectively, reference is made to the above description.

The hydrogen cathode, in particular in the form of the at least one cathode composite as, for example, explained in the previous discussion, preferably forms a pocket wall directly enclosing the pocket cavity. In the case of a cylindrically formed pocket, the hydrogen cathode, in particular the at least one cathode composite, thus preferably forms the shell of the pocket. In other words, a cavity defined by the hydrogen cathode, in particular by the at least one cathode composite, forms the cavity of the at least one pocket.

In particular, the at least two cathode bodies connect to one another such that the above described porous and hydrophobic layers or foils, respectively, are directly facing towards a cavity defined by the hydrogen cathode, in particular by the at least one cathode composite.

The hydrogen cathode, in particular the at least one cathode composite, or a longitudinal axis defined by the cathode or composite, respectively, in particular a longitudinal axis of symmetry, is preferably aligned orthogonally or essentially orthogonal to a preferably planar bottom region of the casing.

The hydrogen cathode, in particular the at least one cathode composite, is further preferably disposed coaxially inside the casing of the hydrogen evolution cell.

The hydrogen cathode, in particular the at least one cathode composite, may be arranged centrally or approximately centrally inside the casing.

Particularly preferably, the at least two cathode bodies are conventional electrodes and hydrogen cathodes, respectively. It is preferred when the at least two cathode bodies are gas diffusion electrodes, in particular polymer-bound gas diffusion electrodes. With regard to further features and advantages, reference is completely made to the general explanations given in connection with the hydrogen cathode of the cell.

The connection, in particular bonding, of electrode bodies, in particular of such bodies having PTFE foils, generally is an established technology so that the above examples do not or at least not significantly increase the risk of leaks.

The hydrogen cathode, in particular the at least one cathode composite, may be separated from the anode or the anode mass, respectively, by a separator on the external face, in particular on the shell external face, of the cathode or composite. In the case of a hydrogen cathode or a cathode composite forming a hollow body, the term "external face" refers to the face of the cathode or the cathode composite facing away from the hollow body. The separator may be a separator conventionally used in button cells and hydrogen evolution cells. The separator may be formed as a foil, in particular as a polyolefin foil.

The hydrogen cathode, in particular the at least one cathode composite, and in particular the anode may be arranged in a casing cup of the hydrogen evolution cell.

As already mentioned, it can in fact be provided that the at least one pocket is completely formed by the hydrogen cathode, in particular by the at least one cathode composite. In this case, both the pocket wall and the pocket bottom are formed by the hydrogen cathode, in particular by the at least one cathode composite.

However, alternatively, the pocket bottom may be formed by a separator, insulating or sealing material. For example, a separator arranged between the hydrogen cathode, in particular the at least one cathode composite, and the anode can extend along the lower end face of the hydrogen cathode, in particular of the at least one cathode composite, and form a pocket bottom.

The at least one pocket may have a pocket opening at the upper end face of the hydrogen cathode, in particular of the at least one cathode composite.

The anode may completely surround the at least one pocket with the exception of the pocket opening.

The hydrogen developing during the cell operation and accumulating in the at least one pocket is generally supplied to an applicable load, preferably to a fuel cell, in particular a mobile fuel cell.

Thus, the hydrogen evolution cell may have an outlet opening for the gas on the pocket opening side for removal of the hydrogen. The at least one outlet opening may be formed as a simple through hole of a casing lid. As an alternative, the at least one outlet opening may be the end of a hydrogen removal conduit, for example, a pipe or a hose, projecting from the at least one pocket (or the opening thereof, respectively) and practically from a casing lid.

To stabilize the at least one hydrogen cathode, in particular of the at least one cathode composite, the cathode or composite may be installed in a supporting structure, preferably in a frame, for example, a slot frame.

As already mentioned, the casing of the hydrogen evolution cell is generally formed in two parts and comprises a casing lid and a casing cup. The casing lid preferably comprises passages for electrode conductors and contacts, respectively, and for one or a plurality of outlet openings and removal conduits, respectively, as the case may be. Purposefully, the lid and the passages are hermetically sealed.

Particularly preferred, the casing of the hydrogen evolution cell is a two-part, nonmetallic casing, in particular a synthetic material casing formed by two parts, i.e., a casing having a casing lid and a casing cup each made of synthetic material.

Providing particular advantage, the hydrogen evolution cell does not have synthetic material components arranged between a casing lid and a casing cup for electric insulation and/or sealing, in particular in the form of synthetic material rings (O rings) or the like, which are potential leak spots in known cells.

The casing may have a cylindrical, preferably prismatic, in particular quadratic, or circular-cylindrical form.

In the case of a cuboid-shaped configuration of the casing, the casing may have a height (external dimension/internal dimension) of 167 mm to 237 mm/155 mm, a width of 80 mm to 85 mm/75 mm to 80 mm and a depth of 27 mm to 46 mm/23 mm to 40 mm.

Preferably, the casing defines a casing volume of 10 ml to 1 l. In the case of greater structures, flatter casing designs, for example, having a thickness<50 mm, may be advantageous, since in particular the discharge of a zinc anode may be difficult over longer distances.

To achieve a hermetical tightening of the casing, the casing lid and the casing cup are usually sealed to one another, in particular bonded or welded. In particular, the sealing of synthetic material casings formed by two parts is an established technology so that the occurrence of leaks can be counteracted effectively.

Preferably, the casing is a synthetic material casing, as typically used for nickel cadmium accumulators and nickel zinc accumulators.

The casing can, for example, comprise a casing cup made of polystyrene and a casing lid made of an acrylonitrile-butadiene-styrene terpolymer. As an alternative, the casing cup may be composed of a polyamide which is, for example, welded to a thermal mirror serving as a casing lid.

Further features and advantages result from the following description of preferred example. The features described and illustrated therein may in each case be realized on their own or in a combination thereof. The examples merely serve for explanation and for a better understanding and are not to be understood as limiting in any manner. The figures are incorporated into the content of the description by explicit reference.

The hydrogen evolution cell 100 shown in FIG. 1 comprises a two-part, prism-shaped casing 110 with a casing lid 112 and a casing cup 118. The casing cup 118 comprises a plane bottom region 116 and the casing lid 112 comprises a plane lid region 114 parallel to the bottom region 116.

The cell 100 comprises a metal anode 120, preferably made of a zinc paste, an aqueous alkaline electrolyte such as aqueous caustic potash, and a binder.

Furthermore, the cell 100 comprises a hydrogen cathode 140 in the form of a cathode composite forming a hollow body.

The cathode composite 140 is formed by two foil-type cathode bodies 142 and 148, preferably in the form of cathode half components. Preferably, the cathode bodies 142 and 148 are in each case gas diffusion electrodes, in particular polymer bound gas diffusion electrodes.

On one side, in each case micro-porous and hydrophobic foils 143 and 145, preferably PTFE foils, are laminated on the cathode bodies 142 and 148.

To form the composite 140, the cathode bodies 142 and 148 connect to one another, for example, by a bond 146, on the longitudinal edge side on their foil sides such that the foils 143 and 145 line the internal face of the cathode composite 140, i.e., that they are directly facing towards the hollow space 150 defined by the cathode composite 140.

The axis of symmetry 149 defined by the cathode composite 140 is arranged orthogonally or essentially orthogonally to the casing bottom region 116. In this case, both the cathode composite 140 and the anode 120 are arranged in the casing cup 118.

The cathode composite 140 is separated from the metal anode 120 by a separator 160 on the side of the composite facing away from the hollow space 150. Moreover, the separator 160 extends completely along the lower end face 141 of the cathode composite 140.

As a whole, the cathode composite 140 and the separator 160 form the pocket (or a pocket-type structure) 170 defining the hollow space 150 along the lower end face 141, wherein the composite 140 represents the pocket wall (or the shell in the case of a cylindrically-shaped pocket) and the separator 160 represents the bottom of the pocket 170 (pocket bottom) along the lower end face 141. The opening 172 of the pocket 170 is located on the upper end face 147 of the cathode composite 140.

A hydrogen removal conduit 174, for example, in the form of a pipe or a hose, with an outlet opening 176 for hydrogen projects from the pocket opening 172.

In case current flows through the hydrogen evolution cell 100, hydrogen gas develops at the cathode composite 140, which gas gets into the hollow space 150 via the foils 143 and 145.

Particularly advantageously, the hollow space 150 serves as an accumulation reservoir for the hydrogen developing during cell operation. At the same time, the hollow space 150 serves as a reservoir to buffer for possible hydrogen overpressure challenging the leak tightness of the cell. Via the removal conduit 174, the developing hydrogen can be removed from the cell 100 to a load such as a mobile fuel cell, for example.

The casing lid 112 and the casing cup 118 are composed of synthetic material. The casing 110 is preferably a casing as conventionally used as an empty casing for nickel cadmium accumulators. To achieve a hermetical seal, the casing lid 112 and the casing cup 118 may be bonded to one another, for example, by a bonding agent 182. Thus, the use of electrically insulating and in particular sealing plastic components between the casing lid 112 and the casing cup 118 can be omitted (in contrast to metallic casings).

The casing lid 112 includes passages (not shown) for the removal conduit 174 as well as for the electrode conductors 124 (anode conductor) and 144 (cathode conductor).

Figure 2A:
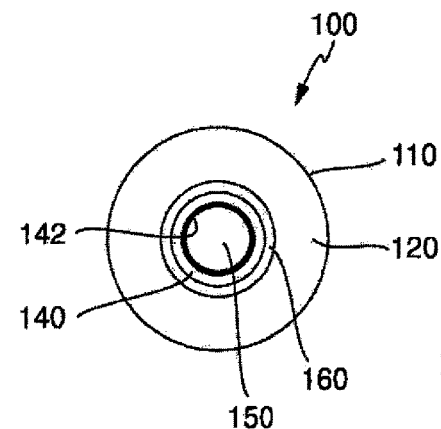
FIG. 2a schematically shows the plan view of another example of a hydrogen evolution cell.

The hydrogen evolution cell 100 shown in FIG. 2a has a circular-cylindrically formed casing 110. In the casing 110, a hydrogen cathode 140 is arranged centrally and coaxially in the form of a cathode composite forming a circular hollow cylinder. The internal face of the cathode composite 140 is covered with a micro-porous and hydrophobic foil 142 such as, for example, a PTFE foil.

The composite 140 is separated from the anode mass 120 by a separator 160. The separator 160 additionally extends over the entire lower end face of the composite 140 (not shown) while the upper end face (facing the viewer) of the composite 140 is open, that means not being covered.

As a result, a pocket having a hollow space 150 develops, which space is limited by a pocket wall formed by the cathode composite 140 and by a pocket bottom which is formed by the separator extending over the lower end face region of the composite 140. The opening of the pocket extends along the upper, open end face.

Figure 2B:
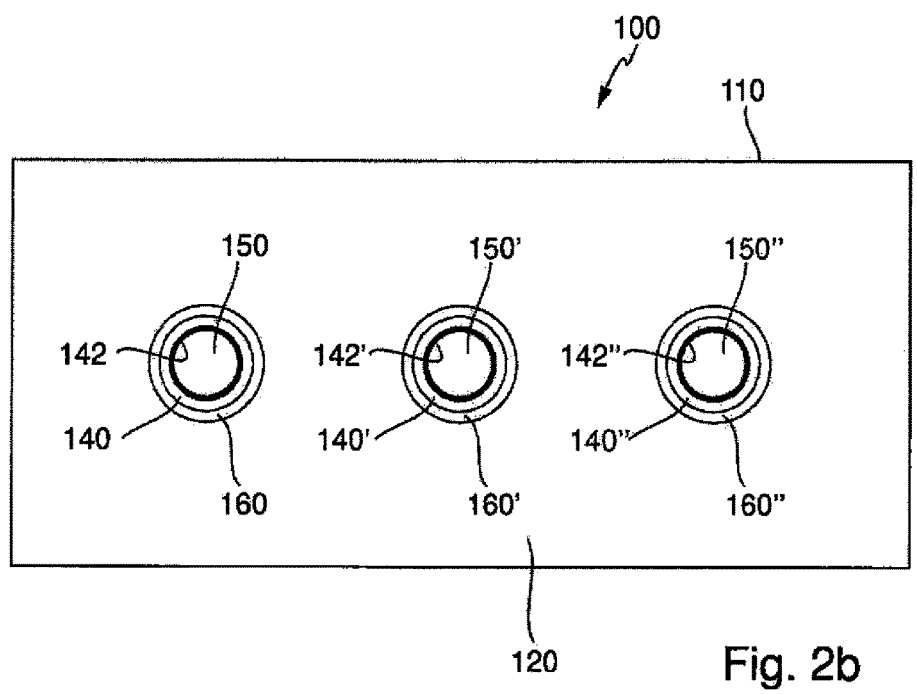
FIG. 2b schematically shows the plan view of another example of a hydrogen evolution cell.

In the case of the hydrogen evolution cell 100 shown in FIG. 2b, the hydrogen cathode is present in the form of three cathode composites 140; 140' and 140"—in each case in the type as described in FIG. 2a.

The cathode composites 140; 140' and 140" are separated from the anode mass 120 by a separator 160; 160' and 160". The internal faces of the cathode composites 140; 140' and 140" are lined with a micro-porous and hydrophobic foil 142; 142' and 142" such as a PTFE foil, for example. The casing 110 has a prism-type design.

Figure 3:
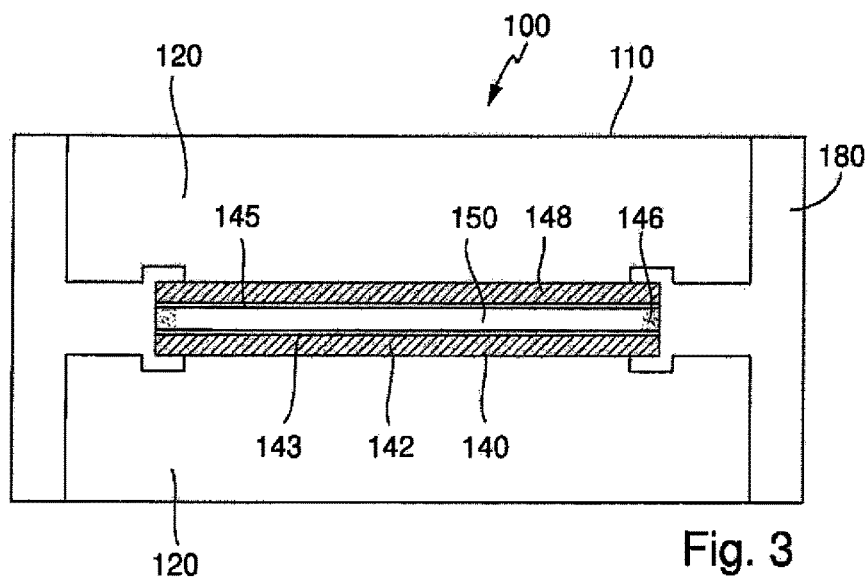
FIG. 3 schematically shows the plan view of another example of a hydrogen evolution cell.

FIG. 3 shows the plan view of another example of a hydrogen evolution cell 100. The cell 100 has a prism-type casing 110. In the casing 110 or a casing cup thereof, respectively, there is a hydrogen cathode 140 in the form of a cathode composite formed of two cathode bodies, preferably cathode halves, 142 and 148. The composite 140 defines a hollow space 150 and is separated from the anode mass 120 by a separator (not shown). For the support of the cathode composite 140 and in particular to prevent the cathode composite 140 from bursting at the bonded spots in the case of a hydrogen overpressure, the composite is installed into a slot frame 180, wherein the slot frame 180 preferably exerts a clamping function on the cathode composite 140.

Figure 4:
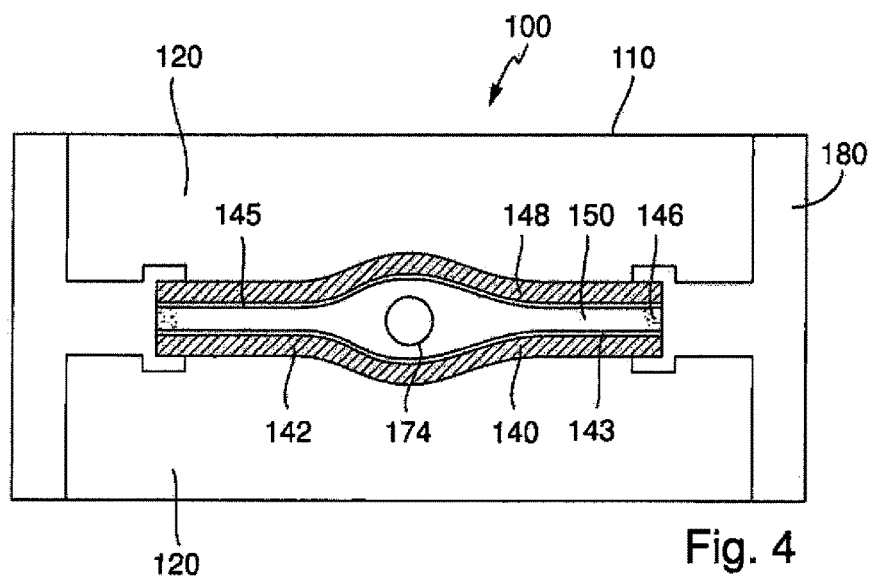
FIG. 4 schematically shows the plan view of a further example of a hydrogen evolution cell.

In FIG. 4, another example of a cell 100 is shown. The cell differs from the variant shown in FIG. 3 essentially in that the hydrogen cathode 140 is present in the form of a cathode composite, the hollow space 150 of which is expanded "lens-shaped" in the region of the hydrogen removal conduit 174.

The invention claimed is:

1. A hydrogen evolution cell which on passage of an electric current liberates an amount of hydrogen proportional to an amount of current flowing through, comprising an electrochemically oxidizable anode, a hydrogen cathode, an electrolyte and a casing surrounding the same, wherein the hydrogen cathode is associated structure of at least one pocket defining a hollow space or defines a hollow space in the presence of hydrogen overpressure or wherein the cathode forms such a pocket, wherein the hydrogen cathode is in the form of at least one cathode composite forming a hollow body, the at least one cathode composite is formed by two cathode bodies, the two cathode bodies are coated in each case on one side with a microporous and hydrophobic foil, the two cathode bodies connect to one another such that the foils line the internal face of the hollow body formed by the at least one cathode composite, the cathode composite is separated from the oxidizable anode by a separator on an external face of the cathode composite, and the anode is zinc or contains zinc.

2. The hydrogen evolution cell according to claim 1, wherein the at least two cathode bodies are bonded to one another on a longitudinal edge side, and by material engagement.

3. The hydrogen evolution cell according to claim 1, wherein the hydrogen cathode and a longitudinal axis defined by said cathode, respectively, are arranged orthogonally or essentially orthogonally to a planar bottom region of the casing.

4. The hydrogen evolution cell according to claim 1, wherein the hydrogen cathode forms a pocket wall directly limiting the pocket hollow space.

5. The hydrogen evolution cell according to claim 1, wherein along a lower end face of the hydrogen cathode the at least one pocket has a pocket bottom made of a separator, insulating or sealing material.

6. The hydrogen evolution cell according to claim 1, wherein the at least one pocket has an outlet opening for hydrogen on a pocket opening side in the form of a hole or an end of a hydrogen removal conduit which protrudes from the pocket opening.

7. The hydrogen evolution cell according to claim 1, wherein the casing is a nonmetallic casing formed of two parts.

8. The hydrogen evolution cell according to claim 1, wherein the cell does not have synthetic material components arranged between a casing lid and a casing cup and provided for electrical insulation and/or sealing.

9. The hydrogen evolution cell according to claim 1, wherein the casing is cylindrical, prism-shaped, cuboid-shaped, or circular-cylindrical.

10. The hydrogen evolution cell according to claim 2, wherein the at least two cathode bodies are coated in each case on one side with a micro-porous and hydrophobic foil.

11. A hydrogen evolution cell which on passage of an electric current liberates an amount of hydrogen proportional to an amount of current flowing through, comprising an electrochemically oxidizable anode, a hydrogen cathode, an electrolyte and a casing surrounding the same, wherein the hydrogen cathode is associated structure of at least one pocket defining a hollow space or defines a hollow space in the presence of hydrogen overpressure or wherein the cathode forms such a pocket, wherein the casing has an outlet opening for hydrogen generated during cell operation, the outlet opening is at an end of a hydrogen removal conduit projecting from the at least one pocket, the hydrogen cathode is separated from the anode by a separator, and the anode is zinc or contains zinc.

* * * * *